United States Patent

Zachoszcz

[11] Patent Number: 5,913,583
[45] Date of Patent: Jun. 22, 1999

[54] COMPUTER ENCLOSURE

[75] Inventor: Andrew Zachoszcz, San Francisco, Calif.

[73] Assignee: Hon Hai Precision Ind. Co., Ltd., Taipei Hsien, Taiwan

[21] Appl. No.: 09/166,475

[22] Filed: Oct. 5, 1998

[51] Int. Cl.⁶ ................................................ A47B 47/00
[52] U.S. Cl. ................ 312/263; 312/265.5; 361/752
[58] Field of Search .............. 312/223.1, 223.2, 312/265.5, 205, 263; 361/752, 829, 825, 681, 682, 683, 730; 220/788

[56] References Cited

U.S. PATENT DOCUMENTS

| | | |
|---|---|---|
| 5,031,070 | 7/1991 | Hsu ........................................ 361/752 |
| 5,124,885 | 6/1992 | Liu ......................................... 361/825 |
| 5,164,886 | 11/1992 | Chang .................................... 361/380 |
| 5,278,351 | 1/1994 | Herrick .................................. 361/683 |
| 5,587,877 | 12/1996 | Ryan et al. ............................. 361/683 |
| 5,590,938 | 1/1997 | De Andrea .......................... 312/265.5 |
| 5,600,538 | 2/1997 | Xanthopoulos ........................ 361/683 |
| 5,660,297 | 8/1997 | Liu ........................................ 220/4.02 |

*Primary Examiner*—Peter M. Cuomo
*Assistant Examiner*—Gerald A. Anderson

[57] ABSTRACT

An enclosure for housing a personal computer includes a U-shaped base casing consisting of a bottom panel, a front panel, and a rear panel. The front and rear panels extend upward from front and rear edges of the bottom panel. Two side panels are assembled to the base casing from a top portion thereof and the top cover is attached to the base casing from a rear portion thereof.

5 Claims, 3 Drawing Sheets

COMPUTER ENCLOSURE

BACKGROUND OF THE INVENTION

1. Field of the Invention

The invention relates to a computer enclosure, and particularly to the structural arrangement of a base casing, side panels and a top cover thereof which are mutually engaged with each other and commonly define a complete assembly of the enclosure.

2. The Related Art

In general, a computer system comprises electrical elements for driving the system and mechanical elements for protecting and containing the electrical elements. The most important mechanical element is an enclosure of the computer, which provides not only a protective casing for the internal parts within the computer, but also a decorative appearance. U.S. Pat. No. 5,590,938 addresses several requirements/preferences for the frame structure including the enclosure. Ease of assembly while having a strong structure and a reliable EMI/RFI shielding have been major considerations in recent years.

U.S. Pat. No. 5,164,886 discloses a desktop personal computer enclosure with a U-shaped hood having a plurality of hooks for engagement with corresponding notches defined in the base. The hooks are formed on the inner surface of the hood and may assist in preventing EMI/RFI. However, the hooks must be welded onto the hood resulting in a complicated and costly procedure.

In U.S. Pat. No. 5,278,351, a personal computer enclosure comprises a hood having side spring channel clips and a top spring channel clip, and a base casing having lips for engaging with the corresponding spring channel clips. The spring channel clips are elongated and welded along the sides of the hood resulting in an inconvenient and costly manufacturing process. Furthermore, gaps existing between the front panel and the hood and facing the user allow electromagnetic waves to escape therefrom leading to complications caused by EMI/RFI. U.S. Pat. Nos. 5,587,877, 5,600,538 and 5,660,297 also disclose different types of casings for housing personal computers.

Accordingly, an object of the invention is to provide an enclosure for a personal computer which is easily manufactured and assembled and which provides good and reliable shielding from EMI/RFI.

SUMMARY OF THE INVENTION

According to an aspect of the invention, a personal computer enclosure includes a U-shaped base casing consisting of a bottom panel, a front panel extending upward from a front edge of the bottom panel and a rear panel extending upward from a rear edge of the bottom panel. Flanges extend from edges of the bottom panel, front panel and rear panel. Two side panels having integrated tangs are assembled to the base casing from a top portion thereof. The flanges of the bottom, front, and rear panels, and the corresponding tangs engage with each other. A top cover having downward offset flanges is attached to the base casing from a rear portion thereof. The flanges of the top cover are retainably received within the corresponding tangs of the side panels.

DETAILED DESCRIPTION OF THE PREFERRED EMBODIMENTS

Reference will now be in detail to the preferred embodiment of the present invention.

Figure 1:
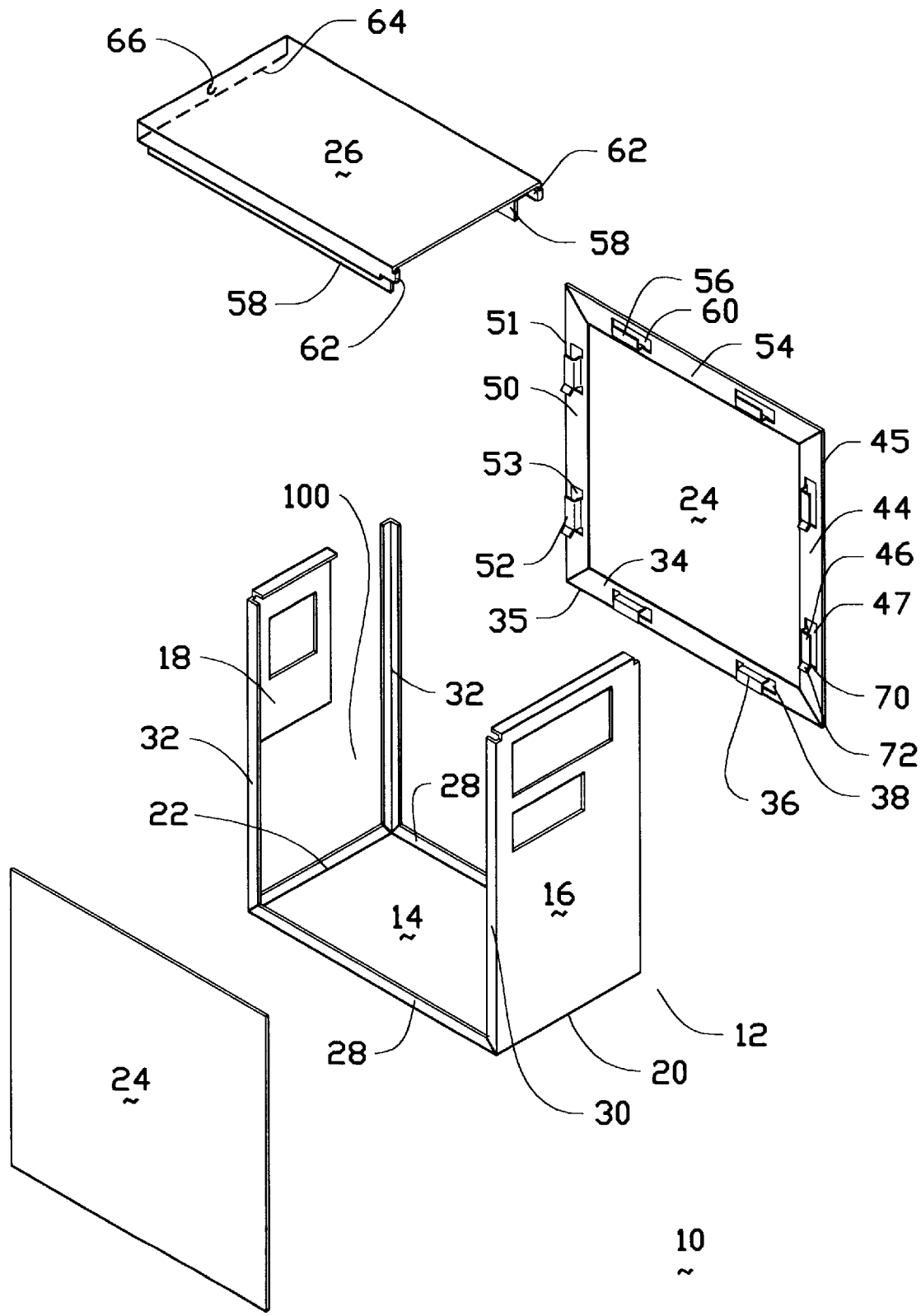
FIG. 1 is an exploded perspective view of a preferred embodiment of an enclosure in accordance with the present invention.

Referring to FIG. 1, an enclosure 10 of a personal computer includes a U-shaped base casing 12 consisting of a bottom panel 14, a front panel 16 and rear panel 18. The front and rear panels 16, 18 extend upward from front and rear edges 20, 22 of the base casing 12, respectively. Two side panels 24 are assembled to corresponding sides of the base casing 12, and a top cover 26 is attached to a top portion of the base casing 12.

To efficiently and mutually combine the related adjacent panels together and to reliably implement EMI/URFI shielding protection, the bottom panel 14 forms a first pair of flanges 28 upwardly extending from two side edges thereof Similarly, the front panel 16 forms a second pair of flanges 30 rearwardly extending from two sides thereof, and the rear panel 18 forms a third pair of flanges 32 forwardly extending from two sides thereof.

Corresponding to the first pair of flanges 28 of the bottom panel 14, each side panel 24 includes an upwardly folded bottom inner flange 34 along a bottom edge 35 thereof A plurality of spring tangs 36 are inwardly punched from the flange 34 and each defines a space 38 for receiving the corresponding first flange 28 of the bottom panel 14 .

Figure 2:
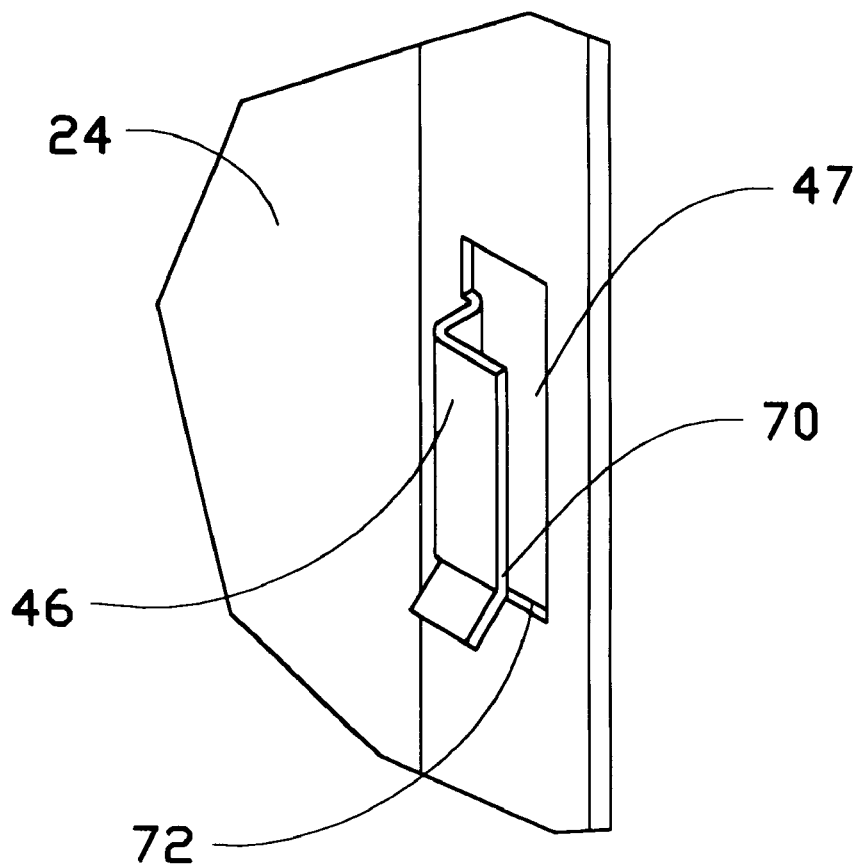
FIG. 2 is an enlarged partial view of a side panel in accordance with the present invention, which shows a tang of the side panel.

Similarly, the side panel 24 includes a backward folded front inner flange 44 along a front edge 45 and a forward folded rear inner flange 50 along a rear edge 51 thereof. A plurality of spring tangs 46, 52 are pinched inward from the flanges 44, 50 and respectively define spaces 47, 53 for receiving the corresponding second flange 30 of the front panel 16 and third flange 32 of the rear panel 18. Referring also to FIG. 2, for proper retention of the first flange 30 within the spaces 47 of the side panel 24, each tang 46 has a converging waist 70 and a diverging opening 72 for providing easy insertion and resilient retention between the flanges 30 and the tangs 46. The tang 52 also has a converging waist 70 and a diverging opening 72 and the second flange 32 can be retained in the space 53.

To cooperate with the top cover 26, each side panel 24 forms a flange 54 on a top edge thereof similar to the flange 34 and the associated tangs 36 on the bottom edge 35.

Figure 3:
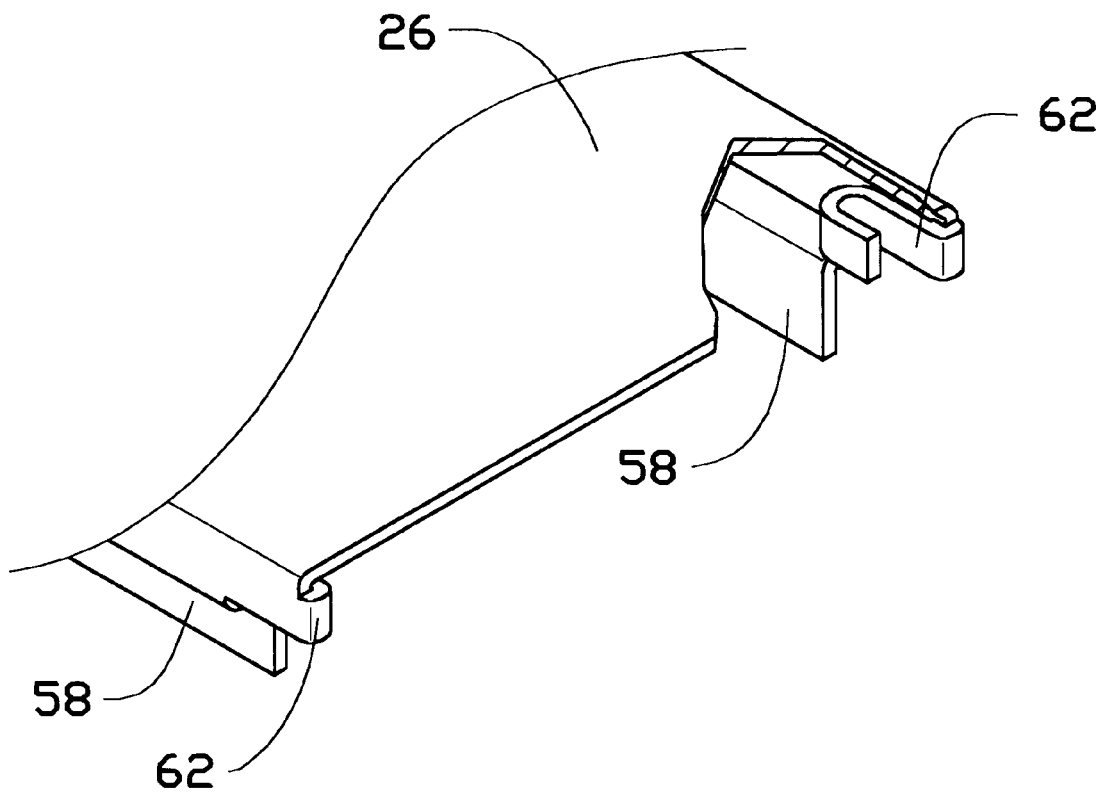
FIG. 3 is an enlarged partial view of a top cover in accordance with the present invention, which shows a hook of the top cover.

Also referring to FIG. 3, the top cover 26 forms two downwardly extending side offset flanges 58 on two side edges thereof for being retainably received in a space 60 defined between the tangs 56 and the flanges 54 of the side panels 24. A pair of inwardly folded hooks 62 are respectively formed on the front portion of the side edges of the top cover 26 for receiving top portions of the flanges 30 of the front panel 16. A flange 64 extends downward from a rear edge of the top cover 26 and defines a screw hole 66 therein for fastening to the rear panel 18.

When assembled, the two side panels 24 are attached to the base casing 12 from the top portion thereof, thus the flanges 34, 44, 50 and their associated tangs 36, 46, 52 retainably receive the corresponding flanges 24, 30, 32 of the base casing 12. The base casing 12 is assembled with the side panels 24 resulting in a semi-finished assembly. The top cover 26 is assembled to the semi-finished assembly from the rear portion thereof, thus the flanges 58 are retainably received by the flanges 54 and the associated tangs 56 of the side panels 24. Finally, the top cover 26 is fastened to the semi-finished assembly by means of a screw extending through the screw hole 66.

The invention provides an easy and reliable assembly structure and method for the enclosure. This structure can be adapted for use with the subject matter disclosed in the pending provisional application Ser. No. 60/058,728 filed Sep. 12, 1997, whereby the NLX type mother board can be upwardly withdrawn from the enclosure 10 by removal of the top cover first. In addition, the ATX type mother board can be directly inserted or withdrawn from a rear portion of the enclosure 10 without disassembling the enclosure 10 due to a large opening 100 existing in the rear panel 18.

While the present invention has been described in with reference to a preferred embodiment, the description is illustrative of the invention and is not to be construed as limiting the invention. Various modifications to the present invention can be made to the preferred embodiment by those skilled in the art without departing from the true spirit and scope of the invention as defined by the appended claims.

I claim:

1. An computer enclosure, including:

a base casing comprising a bottom panel, a front panel and a rear panel, in which the front and rear panels extend upward from opposing edges of the bottom panel and the panels form flanges along longitudinal sides thereof;

a top cover comprising a pair of inwardly folded flanges formed along longitudinal sides thereof;

side panels having folded inner flanges along each edge thereof with a plurality of spring tangs formed thereon;

wherein the side panels may be assembled to the base casing from a top portion thereof and the flanges of the bottom, front and rear panels engage with the corresponding spring tangs of the side panels, said top cover is assembled to a semi-finished assembly of the side panels and base casing from a rear portion thereof and the inwardly folded flanges engage with the corresponding spring tangs of the side panels.

2. The computer enclosure as described in claim 1 wherein, said top cover forms a pair of hooks on the front portion thereof for receiving the flanges of the front panel.

3. The computer enclosure as described in claim 1, wherein said folded inner flanges of said side panels each include a front inner flange and a rear inner flange.

4. The computer enclosure as described in claim 3, wherein said tangs formed on said front and rear inner flanges have a converging waist and a diverging opening.

5. The computer enclosure as described in claim 1, wherein said top cover forms a downward flange extending from a rear edge thereof, said downward flange defining a screw hole therein for fastening to said rear panel.

* * * * *